United States Patent [19]
Didato

[11] Patent Number: 5,863,112
[45] Date of Patent: Jan. 26, 1999

[54] EMERGENCY BRAKE ILLUMINATOR

[76] Inventor: Thomas Didato, 32 Washington Ave., Middlesex, N.J. 08846

[21] Appl. No.: 65,166

[22] Filed: Apr. 23, 1998

[51] Int. Cl.⁶ ..................................................... B60Q 3/00
[52] U.S. Cl. ........................... 362/488; 362/84; 362/276; 362/800; 340/457.3
[58] Field of Search ............... 362/61, 80, 83.3, 362/800, 84, 253, 276, 293, 488, 489, 541; 340/453, 457.3

[56] References Cited

U.S. PATENT DOCUMENTS

| | | |
|---|---|---|
| 2,031,202 | 2/1936 | Bier . |
| 2,234,607 | 3/1941 | Riedmaier . |
| 2,305,983 | 12/1942 | Muth . |
| 2,343,394 | 3/1944 | Blomberg et al. . |
| 2,503,553 | 4/1950 | Hollins . |
| 3,381,269 | 4/1968 | Fierbaugh et al. . |
| 3,731,272 | 5/1973 | Cryer ................................... 340/457.3 |
| 5,694,113 | 12/1997 | Chen ...................................... 340/479 |

*Primary Examiner*—Stephen Husar

[57] ABSTRACT

An emergency brake illuminator for a motor vehicle comprising in combination (a) an emergency brake having a means for activating said brake, (b) a light located on the means for activating said brake, and (c) means for turning on said light when the vehicle's ignition switch is on so that when the ignition switch is on, the light is also on.

16 Claims, 1 Drawing Sheet

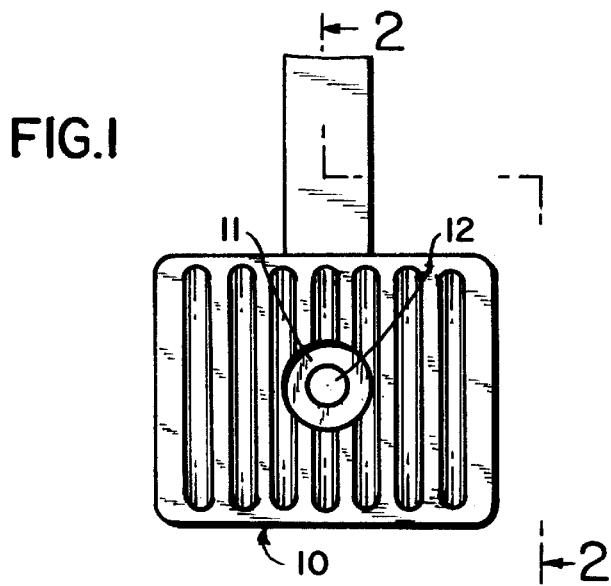
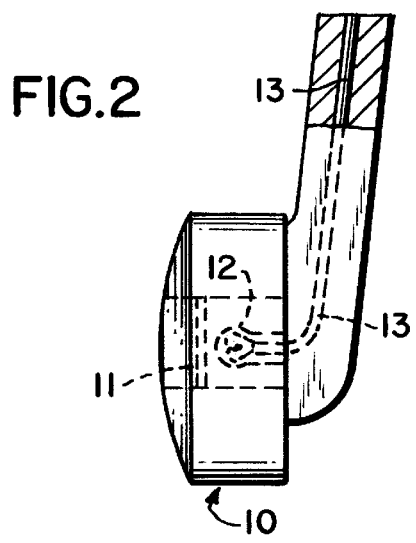
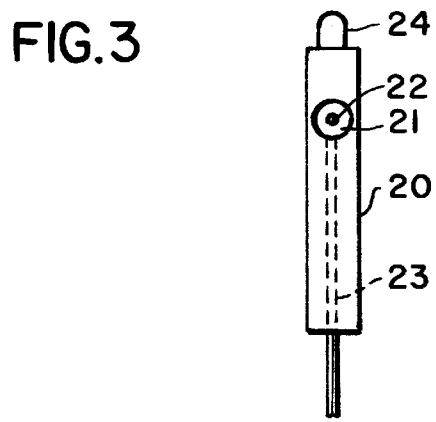
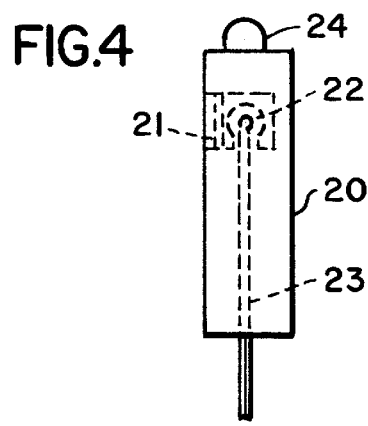
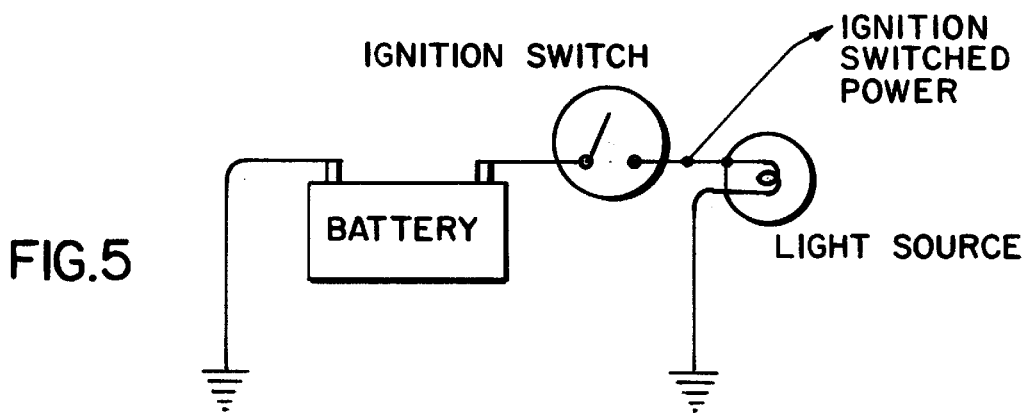

EMERGENCY BRAKE ILLUMINATOR

BACKGROUND OF THE INVENTION

The present invention relates to a brake light illuminator that indicates the location of the emergency brake when the ignition is on, thereby allowing the driver to find the emergency brake without fumbling or hesitation when the need arises to use it.

The emergency brake, or parking brake, is seldom used by a high percentage of vehicle drivers or operators. Therefore, when an emergency arises requiring a quick stop, standard brake failure, etc., most of these drivers would at least hesitate before applying an emergency brake if they thought of it and its location at all.

The prior art does not address this problem at all. For example, U.S. Pat. No. 5,694,113 (Chen) describes an emergency brake monitor to remind a driver to release the emergency brake before the automobile starts to move.

U.S. Pat. No. 2,305,983 (Muth), U.S. Pat. No. 2,234,607 (Riedmaier), U.S. Pat. No. 2,343,394 (Blomberg et al.) and U.S. Pat. No. 2,503,553 (Hollins) describe a brake indicator light system in which the light is off when the parking brake is fully released.

U.S. Pat. No. 2,031,202 (Bier) describes an alarm system that is activated when the ignition switch is on and the parking brake is applied.

U.S. Pat. No. 3,381,269 (Freibaugh et al.) describes a signal device for automobiles with automatic transmissions that gives a warning when the ignition is off and the gear shift lever is not in the park position.

SUMMARY OF THE INVENTION

It is an object of the present invention to provide an emergency brake illuminator that serves to notify and/or remind the driver of an automobile, a truck or any other driven piece of equipment where the emergency brake or parking brake or any auxiliary brake is located.

It is another object of the present invention to provide an emergency brake illuminator which is energized every time the engine is started and which remains on while the engine is running.

It is an object of the present invention to provide a means for locating the emergency brake so that the driver may respond positively and without hesitation in an emergency situation.

It is a still further object of this invention to provide a constant reminder to the driver or operator that he should apply this brake quickly and without hesitation, thereby preventing or minimizing accident damage.

It is another object of the present invention to provide a reminder to aged drivers or operators (over age 70 or 75) or persons with known health problems that they should put their vehicle in neutral with the parking brake on while stopped at a traffic light or stopped for any other reason.

It is another object of the present invention to provide a safeguard in the event of a serious problem like the driver being stricken with a heart attack, blackout or other malady thereby preventing further injury to the driver or others in the area by keeping the vehicle stationary.

These and other objects are achieved in accordance with the present invention by providing the motor vehicle with an emergency brake illuminator comprising in combination (a) an emergency brake having a means for activating said brake, (b) a light source located on the means for activating said brake, and (c) means for turning on said light source when the vehicle's ignition switch is on so that when the ignition switch is on, the light source is also on.

BRIEF DESCRIPTION OF THE DRAWINGS

FIG. 1 is an illustration of a foot-operated emergency brake shown as it would appear from the driver's position.

FIG. 2 shows a side view of the brake pedal of FIG. 1.

FIG. 3 is a hand-operated emergency brake shown as it would appear from the driver's position.

FIG. 4 is a side view of the hand-operated emergency brake illustrated in FIG. 3.

FIG. 5 is a diagram of a circuit that may be used to switch on the power to the light source.

PREFERRED EMBODIMENTS OF THE INVENTION

The emergency brake illuminator of the invention may be used on automobiles, trucks or any driven vehicle or piece of equipment. The emergency brake illuminator serves to notify and/or remind the driver or operator of a car or truck or any driven piece of equipment where the emergency brake (or parking brake or any auxiliary brake) is located so he or she will be in a position to respond positively and without hesitation apply the emergency brake in an emergency situation.

The brake illuminator light of the present invention is energized every time the engine is started and it remains on while the engine is running. This will serve as a reminder that the driver has an emergency brake and where it is located. With this constant reminder, a driver or operator should be able to apply this brake quickly and without hesitation, thereby preventing or minimizing accident damage to person or property.

For safety reasons, it is further recommended that aged drivers or operators, i.e., those over age 70 or 75, or persons with known health problems put their vehicle in neutral with the parking brake on while stopped at a traffic light or stopped for any other reason. In the event of a serious problem like the driver being stricken with a heart attack, blackout or other malady, this would prevent further injury to the driver or others in the area by keeping the vehicle stationary.

FIG. 1 illustrates a foot-operated emergency brake of the invention. Brake pedal 10 has centrally located, recessed lens 11 covering bulb 12. The side view of FIG. 1 is shown in FIG. 2 where the base of the bulb 12 is connected to wire 13, which is preferably ultimately connected in series with the ignition switch so that when the ignition switch is on, the light in the emergency brake pedal is on and the location of the emergency brake pedal is made clearly known to the driver.

FIG. 3 is an illustration of a hand-operated emergency brake lever such as may be found in the console between the front seats of many modern automobiles. Lever 20 has on its upper surface visible to the driver, recessed lens 21 covering bulb 22 which is connected to wire 23, which ultimately is preferably connected in series to the ignition switch so that, as with the foot-operated emergency brake, the location of the hand-operated brake is also made apparent to the driver by the light being on when the ignition switch is on. Shown also in FIG. 3 and 4 is the brake release button 24. FIG. 4 is a side view of the hand-operated emergency brake lever shown in FIG. 3 wherein the numbered parts are as described in connection with FIG. 3.

The lenses 11 and 21 may be made of any suitable transparent or translucent material. Although glass may be used, because of its brittle properties and its possibility for shattering, plastic lenses are preferred. Suitable plastics are polycarbonates, polyacrylics, polystyrene, polyethylene, polypropylene, polyesters and the like.

To diminish glare for the driver and to make the indicator light more readily apparent to the driver, it is preferred that the light source not be clear or white; or if it is clear or white, that the lens be colored. Red is the usual indicator of danger or a signal to stop, but any other suitable color may be used, such as orange, yellow, green or blue. If, however, the light source is to be colored, then it is preferred that the lens 11 or 21 be clear or translucent white.

Although incandescent bulbs may be used for the indicator light, they are not preferred because of their generally short life spans. Use of such a bulb would require frequent replacement because the bulb would be on whenever the ignition is on. Consequently, any non-incandescent, long-lived light source is preferable as the light source in the invention. Illustrative of such non-incandescent bulbs or light sources are light-emitting diodes, neon bulbs and electroluminescent panels. The most preferred light sources for the invention are the light emitting diodes (LED). These are available as bright and efficient varieties and are available from numerous sources such as Radio Shack, Hewlett Packard, Toshiba, Nichia, Panasonic, etc. They range from 3 to 14 lumens/watt and come in a variety of colors including deep red, red, orange red, red orange, orange, yellow orange, yellow, yellow green, green, blue-green, blue, whitish blue, white, etc.

As illustrated in FIG. 5, the preferred means for turning on the light source is having the light source wired in series with the ignition switch so that when the ignition switch is on, the light source is on. However, other means for turning on the light source may be used instead. For example, the light source may be controlled by a comparator that senses the higher charging voltage of the alternator (about 14 volts) when the ignition is on by comparing that voltage to the lower voltage of the battery (about 12 volts) and then turns on the light source.

Because of ambient lighting conditions during daylight driving hours, it is preferred that the intensity of the bulb or light source 12 or 22, be sufficiently bright to be noticeable by the driver. However, at night, it is preferred that the intensity of the bulb or light source 12 or 22 be lessened so as not to be annoying to the driver particularly on long journeys. Therefore, it is preferred that there be an automatic dimmer in series in the circuit to sense the day and night time conditions and to allow for the greater intensity required in the bulb or light source 12 or 22 for daylight viewing and the lesser intensity required for nighttime viewing.

There are also instances where it is advantageous for the light source to flash on and off at regular intervals, which is provided by an appropriate known flasher switch circuitry.

There has thus been shown and described a novel emergency brake illuminator which fulfills all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. An emergency brake illuminator for a motor vehicle comprising, in combination: (a) an emergency brake having manually actuated means for activating said brake, (b) a light source located on the means for activating said brake, and (c) electric circuit means for providing continuous power to said light source when the vehicle's ignition switch is on so that when the ignition switch is on, the light source is also on, whereby a motor vehicle operator can quickly and easily identify the location of said means for activating said brake during an emergency situation.

2. An emergency brake illuminator as claimed in claim 1, wherein the light source is wired in series with the ignition switch so that when the ignition switch is on, the light is also on.

3. The emergency brake illuminator as defined in claim 1, wherein the brake activator is a foot pedal.

4. The emergency brake illuminator as defined in claim 1, wherein the brake activator is a hand-operated lever.

5. The emergency brake illuminator as defined in claim 1, wherein the light source is covered by a lens.

6. The emergency brake illuminator as defined in claim 5, wherein the lens is comprised of a plastic.

7. The emergency brake illuminator as defined in claim 6, wherein the plastic is a polycarbonate, polyacrylic, polystyrene, polyethylene, polypropylene, or polyester.

8. The emergency brake illuminator as claimed in claim 6, wherein the lens is either transparent or translucent.

9. The emergency brake illuminator as claimed in claim 6, wherein the lens is colored.

10. The emergency brake illuminator as claimed in claim 1, wherein the light source is colored.

11. The emergency brake illuminator as claimed in claim 1, wherein there is an automatic dimmer wired in series with the light source so that the intensity of the light source is greater during daylight operating conditions and the intensity is lesser during nighttime operations.

12. The emergency brake illuminator as claimed in claim 1, wherein there is in the circuit a means for turning the light source on and off at regular intervals when the ignition is on.

13. The emergency brake illuminator as claimed in claim 1, wherein the light source is a light-emitting diode.

14. The emergency brake illuminator as claimed in claim 1, wherein the light source is a neon bulb.

15. The emergency brake illuminator as claimed in claim 1, wherein the light source is an electroluminescent panel.

16. In a method of operating a motor vehicle which comprises an emergency brake, a manually actuated device for activating said brake, and a light source located on the device for activating said brake, said method comprising the step of providing electric power to said light source to continuously illuminate said light source whenever the motor vehicle is operated.

* * * * *